(12) United States Patent
Patodia et al.

(10) Patent No.: US 11,994,964 B2
(45) Date of Patent: May 28, 2024

(54) DYNAMIC NODE INSERTION OF SECONDARY SERVICES FOR HIGH-AVAILABILITY DURING MAIN DECISION FAILURE AT RUNTIME

(71) Applicant: PAYPAL, INC., San Jose, CA (US)

(72) Inventors: Prabin Patodia, Bangalore (IN); Sumit Kumar, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 401 days.

(21) Appl. No.: 17/364,746

(22) Filed: Jun. 30, 2021

(65) Prior Publication Data
US 2022/0382655 A1 Dec. 1, 2022

(30) Foreign Application Priority Data
May 28, 2021 (IN) .............................. 202141023782

(51) Int. Cl.
*G06F 16/901* (2019.01)
*G06F 11/20* (2006.01)
(Continued)

(52) U.S. Cl.
CPC ...... *G06F 11/2028* (2013.01); *G06F 16/9024* (2019.01); *G06N 20/00* (2019.01);
(Continued)

(58) Field of Classification Search
CPC .............. G06F 11/2028; G06F 16/9024; G06F 2201/805; G06N 20/00; G06N 5/046; G06Q 10/0635; G06Q 30/0631; G06Q 30/0241
See application file for complete search history.

(56) References Cited

U.S. PATENT DOCUMENTS 6,968,390 B1 * 11/2005 Chavez, Jr. ......... G06F 11/2035
709/224
2004/0243915 A1 12/2004 Doyle et al.
(Continued)

FOREIGN PATENT DOCUMENTS

WO 2020206699 A1 10/2020

OTHER PUBLICATIONS

International Search Report and Written Opinion for Application No. PCT/US2022/030937 dated Sep. 28, 2022, 18 pages.
(Continued)

*Primary Examiner* — Matthew M Kim
*Assistant Examiner* — Matthew N Putaraksa
(74) *Attorney, Agent, or Firm* — Haynes and Boone, LLP

(57) ABSTRACT

There are provided systems and methods for dynamic node insertion of secondary services for high-availability during main decision failure at runtime. A service provider, such as an electronic transaction processor for digital transactions, may utilize different decision services that implement rules and/or artificial intelligence models for decision-making of data including data in production computing environment. A main decision service may normally be used for data processing and decision-making. However, at certain times, the main decision service may fail, such as if a data processing node fails to process data or times out while processing a data processing request, such as during electronic transaction processing. During this runtime, a dynamic injection processor may dynamically inject a node that performs a call to a secondary service to process the data on behalf of the node and/or main decision service so that a response is provided to the data processing request.

20 Claims, 6 Drawing Sheets

(51) Int. Cl.
*G06N 20/00* (2019.01)
*G06Q 10/0635* (2023.01)
*G06Q 30/0241* (2023.01)
*G06Q 30/0601* (2023.01)

(52) U.S. Cl.
CPC ..... *G06Q 10/0635* (2013.01); *G06Q 30/0241* (2013.01); *G06Q 30/0631* (2013.01); *G06F 2201/805* (2013.01)

(56) References Cited

U.S. PATENT DOCUMENTS

| | | | | |
|---|---|---|---|---|
| 2005/0075914 | A1* | 4/2005 | Bayne | G06Q 10/06 700/96 |
| 2012/0005724 | A1* | 1/2012 | Lee | H04L 63/0236 726/1 |
| 2012/0221886 | A1* | 8/2012 | Barsness | G06F 11/1482 714/4.2 |
| 2014/0215481 | A1* | 7/2014 | Piet | G06F 11/2041 718/104 |
| 2017/0091227 | A1* | 3/2017 | Vermeulen | G06F 16/27 |
| 2018/0129570 | A1* | 5/2018 | Sirota | G06F 9/4806 |
| 2019/0199612 | A1* | 6/2019 | Manoharan | H04L 69/40 |
| 2019/0205179 | A1* | 7/2019 | Wu | G06F 9/5083 |
| 2020/0007408 | A1* | 1/2020 | Siddappa | H04L 43/0817 |
| 2020/0279250 | A1 | 9/2020 | Good et al. | |
| 2021/0250193 | A1* | 8/2021 | Hojsik | H04L 63/065 |

OTHER PUBLICATIONS

Invitation to Pay Additional Fees for International Application No. PCT/US2022/030937 dated Aug. 4, 2022, 3 pages.

\* cited by examiner

Health Table 302

| Nodes 306 | Node Execution Health 308 | Runtime Threshold Exceeded 310 |
|---|---|---|
| node1 | Good | No |
| node2 | Good | No |
| node3 | Good | Yes |
| node4 | NA | NA |
| node5 | NA | NA |

312 → node1
314 → node2
316 → node3

Health Table 304

| Nodes 306 | Node Execution Health 308 | Runtime Threshold Exceeded 310 |
|---|---|---|
| node1 | Good | No |
| node2 | Good | No |
| node3 | Bad | No |
| node4 | NA | NA |
| node5 | NA | NA |

318 → node1
320 → node2
322 → node3

FIG. 3B

DYNAMIC NODE INSERTION OF SECONDARY SERVICES FOR HIGH-AVAILABILITY DURING MAIN DECISION FAILURE AT RUNTIME

CROSS-REFERENCE TO RELATED APPLICATIONS

The present disclosure is a nonprovisional application of and claims priority under 35 U.S.C. 119 to Indian provisional application no. 202141023782, filed May 28, 2021, which is hereby expressly incorporated by reference herein in its entirety

TECHNICAL FIELD

The present application generally relates to calls to secondary decision services during failure or timeout of main decision services and more particularly to dynamically injecting code for a data processing node to call the secondary decision service during the failure or the timeout.

BACKGROUND

Users may utilize computing devices to access online domains and platforms to perform various computing operations and view available data. Generally, these operations are provided by service providers, which may provide services for account establishment and access, messaging and communications, electronic transaction processing, and other types of available services. During use of these computing services, the service provider may utilize one or more decision services that implement and utilize coded processing rules and/or artificial intelligence (AI) models for decision-making in real-time data processing, such as within a production computing environment. A particular decision service may be associated with providing decision-making operations within a production computing environment, such as live electronic transaction processing operations with an online transaction processor.

However, decision services in the production computing environment may fail or timeout. This may occur when one or more processing nodes timeout or encounter errors that prevent data processing, computing attacks compromise the computing systems, or other failover conditions occur. When the decision service fails, the service provider may be adversely affected by system errors and failures. The service provider may provision secondary services that are called at the same time the primary or main decision service is called. However, failure occurs in a small number of cases, such as less than 1%. Thus, continuous and parallel calls to both the main and secondary service are inefficient and utilize unnecessary computing resources and processing.

BRIEF DESCRIPTION OF THE DRAWINGS

FIG. 3B is an exemplary diagram of a decision quality table for node execution health in a decision service, according to an embodiment;

Figure 1:
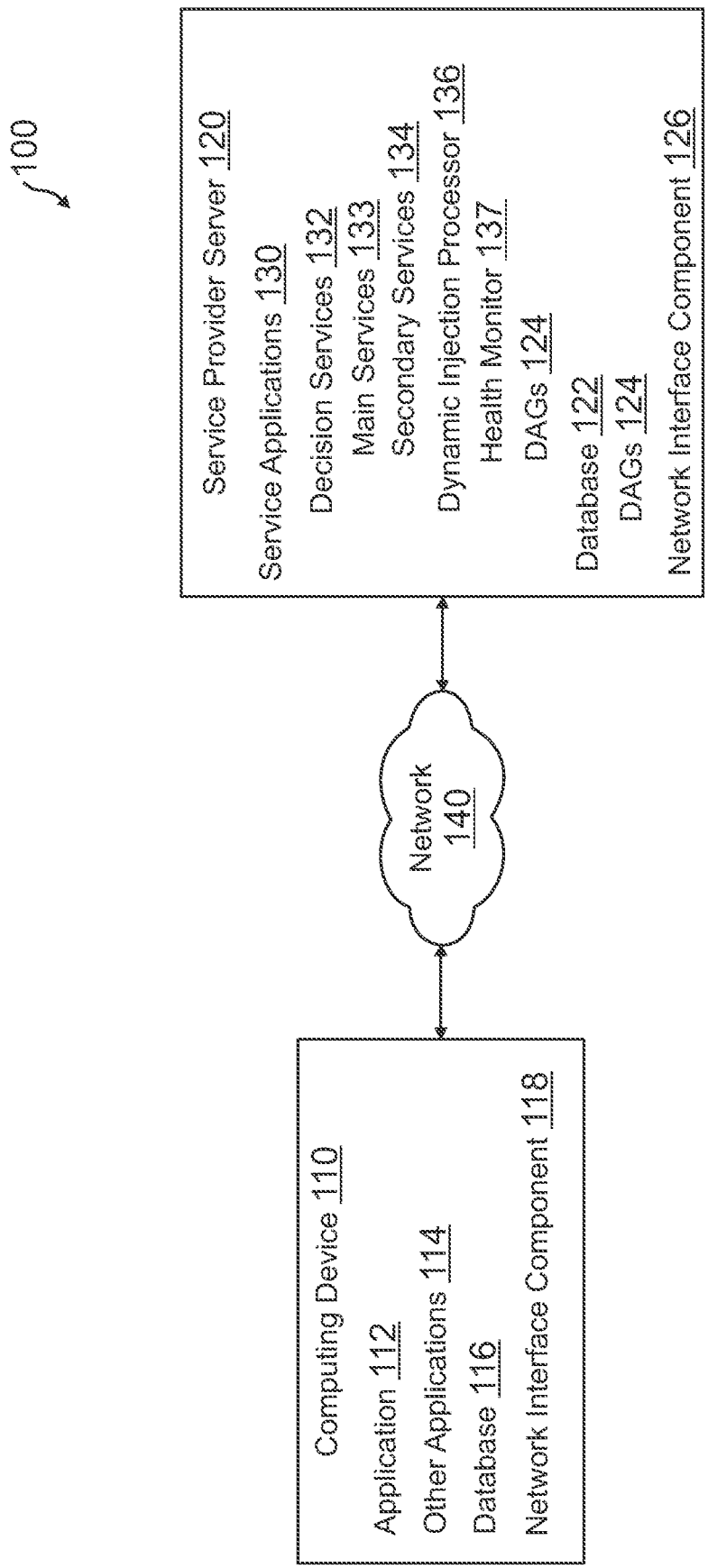
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for dynamic node insertion of secondary services for high-availability during main decision failure at runtime. Systems suitable for practicing methods of the present disclosure are also provided.

A service provider may provide different computing resources and services to users through different websites, resident applications (e.g., which may reside locally on a computing device), and/or other online platforms. When utilizing the services of a particular service provider, the service provider may provide decision services for implementing rules and intelligent decision-making operations with such services. For example, an online transaction processor may provide services associated with electronic transaction processing, including account services, user authentication and verification, digital payments, risk analysis and compliance, and the like. These services may further implement automated and intelligent decision-making operations and engines, including data processing rule engines that automate certain decision-making based on rules designated for the systems. These decision services may be used for risk analysis, fraud detection, and the like to determine if, when, and how a particular service may be provided to users. For example, risk rules may be utilized with a risk engine for a decision service to determine if an indication of fraud is present in a digital transaction and payment, and therefore to determine whether to proceed with processing the transaction or decline the transaction (as well as additional operations, such as request further authentication and/or information for better risk analysis). Thus, decision services automate repeatable decisions based on decision modeling capabilities so that computing service may execute and perform operations requested by a user's computing device.

However, decision services may fail or timeout due to data processing errors, computing attacks, and other events. A service provider may provide a fallback decision service as a secondary decision service that provide decision-making operations when a primary decision service fails, such as a failover of a main decision service in a production computing environment. Conventionally, these secondary decision services are called and invoked at the same time as the primary decision service, and therefore, computing resources are wasted where the secondary decision service is not used (e.g., in ~99% of cases the secondary decision service may not be used).

Thus, data processing invocations based on data processing requests to the main or primary decision service does not always need the secondary decision service to be invoked and called. In this regard, the service provider may instead use a dynamic injection processor to determine if and when a secondary decision service needs to be called and invoked, such as during failure of one or more data processing nodes in the main decision service. If a data processing node fails, the dynamic injection processor may dynamically inject a secondary data processing node that specifically calls the secondary decision service. The secondary data processing node may be used as a fallback when an execution health of the original data processing node indicates that the node will not provide a proper response needed for outputting a decision by the main decision service. Thus, the main decision service may not fail to generate a decision, while the secondary service may not need to be called during all data processing and decision-making requests.

In some embodiments, a service provider, such as an online transaction processor (e.g., PayPal®), may provide services to users including electronic transaction processing that allows merchants, users, and other entities to processes transactions, provide payments, and/or transfer funds between these users. When interacting with the service provider, the user may process a transaction to provide a payment to another user, merchant, or a third-party for items or services. Moreover, the user may view digital accounts and/or digital wallet information, including a transaction history and other payment information associated with the user's payment instruments and/or digital wallet. The user may also interact with the service provider to establish an account and other information for the user. In various embodiments, in order to utilize the computing services of a service provider, an account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments.

The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services. In further embodiments, other service providers may also provide computing services, including social networking, microblogging, media sharing, messaging, business and consumer platforms, etc. These computing services may be deployed across multiple different websites and applications for different operating systems and/or device types. Furthermore, these computing services may utilize the aforementioned decision services when determining decisions during data processing. For example, access and use of these accounts may be performed in conjunction with the aforementioned decision services.

In this regard, a decision service may include different data processing nodes, where each data processing node may include executable instructions to perform one or more computing tasks that process data from a data processing request and output a response. For example, data processing nodes may include a client device request processor, a compute for business rules, a data loader, a validation of a data load of the data processing request, a user authenticator, or a response builder for a decision by the decision service, although other nodes may also be used. In this regard, a decision service may include data processing nodes that obtain an intended result based on a provided data load for a data processing request. Each data node may process all or a portion of a data load (e.g., an independent data load for each node), and may provide a response based on the computing tasks of that node. Thereafter, a decision may be output by a decision service based on the responses to each node that are required for the corresponding decision.

Thus, these nodes are used when determining decisions by the decision service, for example, those nodes required to process and respond to a data processing request by a client device. Nodes may be executed in an order and/or processing flow according to a directed acyclic graph (DAG) or other ordering of the nodes. For example, a DAG may correspond to a flow between nodes that causes output of a decision. Nodes may be arranged in an order within a DAG depending on the decision service and/or data processing request, for example, so that certain nodes may execute and provide data for processing by later nodes. A data processing request may be a request from a client computing device, such as one of an end user or customer of the service provider system, which may request use of a computing service and provide a data load for processing. For example, a data processing request may be associated with a particular request for use of a service for account login, authentication, electronic transaction processing, risk or fraud, and other ones of the aforementioned computing services.

Each node may be connected to and/or executed by a node executor, which organizes the nodes and requests execution of their computing tasks to provide a response needed when providing a decision from the decision service. Additionally, a main decision service may utilize a secondary decision service that similarly includes nodes and/or decision-making that serve as a fallback to the main decision service and the corresponding data processing nodes of the data processing service. However, instead of always calling and running a secondary decision service with the main decision service, the service provider may utilize a system with a dynamic injection processor to dynamically inject data processing nodes that make calls to secondary services in place of a failed data processing node in the decision service. This saves computing resources by limiting execution and runtime of a secondary decision service to occurrences when one or more data processing nodes has failed or will fail. Dynamically injecting a node may also be referred to as inserting the node, such as to a DAG, and/or conditionally substituting the node in place of another node or at a vertex/location required by a DAG.

For example, the dynamic injection processor may interface with a health monitor of the main decision service to monitor the data processing nodes within the main decision service. The health monitor may monitor the nodes based on execution statistics and requirements for the decision service, such as a start time of the main decision service on receiving the data processing request, an average response time for the main decision service, an average response time for the secondary decision service, a service level agreement (SLA) of the main decision service, an SLA of the secondary decision service, or a context of a currently executing DAG in the main decision service. Execution of the data processing nodes may be performed in accordance with a DAG of the main decision service. Each data processing node in the DAG may be represented as a vertex, where each vertex is connected to one or more other vertices (e.g., other data processing nodes) via edges to generate one or more pathways that results in the decision determined by the main decision service. The edges that connect vertices to create a path therefore show the pathway(s) of node execution by the node executor when generating a decision, such as by receiving the responses from each node and determining a decision for the data processing request.

When monitoring the data processing nodes, the health monitor may provide node execution health to the dynamic injection processor. Node execution health may include data regarding whether the node is functioning properly, cannot execute computing tasks and/or make/receive calls, is otherwise unavailable of offline, and the like. Node execution health may also include a time for the node to execute and perform the processing tasks to provide a response, such as an average node response/execution time or a most recent node response/execution time. The dynamic injection processor may include one or more machine learning (ML), neural network (NN), or other artificial intelligence models or engines to perform intelligent decision-making of whether each data processing node, and the main decision service as a whole, can provide a decision perform timeout and/or the time required by the SLA. For example, the input features for the dynamic injection processor to determine if one or more nodes may be offline may include a start time of the main decision service for processing a data processing request to provide a decision, an average execution time of the main decision service and the secondary decision service, SLAs for the main decision service and the secondary decision service, and/or a currently executing DAG of the main decision service and data processing nodes. Each node's execution health and/or time for execution and/or providing a response.

The dynamic injection processor may therefore detect a failure of one or more data processing nodes. Failovers or failures, as used herein, may be defined in different embodiments as any condition that results in the main decision service and/or one or more data processing nodes of the main decisions service not being able to process data at all or not being able to process transactions within certain thresholds, such as accuracy and/or time thresholds (e.g., timeout). Thus, when a failure occurs with the production computing environment caused by the main decision service, such as when a data processing node fails or times out, the dynamic injection processor may determine that the secondary decision service is required to be called for decision-making and a response to a data processing request currently being processed by the main decision service. This may occur during runtime or while the DAG of the main decision service is being executed, such as while the main decision service is executing and processing the data processing request.

The dynamic injection processor may generate and/or inject a secondary data processing node to the DAG at a location or placement associated with the failed data processing node, such as at or nearby the failed node's vertex. This may be a point where the secondary node can be called and executed in place of or with the failed data processing node. Injecting the secondary data processing node may include injecting or inserting computing code that executes one or more application programming interface (API) calls to the secondary service that requests a response for the failed node's computing task(s) and the corresponding functionality of the task(s). For example, in computing code for the main decision service and the DAG being executed by the node executor with the main decision service's nodes, the computing code for the secondary data processing node may be inserted in a location within the DAG that allows the secondary data processing node to be called in place of the failed node.

The secondary node may call a secondary decision service that provides a response in place of the failed data processing node. When calling the secondary decision service, the response from the secondary decision service may be used in place of the response from the failed node, and the other data processing nodes may proceed to a decision for the data processing request in accordance with the DAG. Thus, the node executor may continue executing nodes along the pathway(s) of the DAG to arrive at a decision provided by the main decision service for the data processing request. The dynamic injection processor may inject the secondary data processing node with sufficient remaining time before timeout and/or SLA requirements so that a decision may be provided by the decision services. Further, this allows the more robust data processing nodes to be used where available, while only using the secondary decision service for specific failed nodes.

After calling the secondary decision service during the failure of the data processing node, the dynamic injection processor may remove the secondary node and/or code for the secondary node from the DAG executable by the node executor, which allows the primary node in the main decision service to be used again. The dynamic injection processor may remove the node so that the secondary service does not need to be called until another failure occurs; however, this may delay removing the secondary node if continued failure is detected or predicted. This allows the response to be received for the failed node and for the data processing request to complete with the decision services so that a response or other result to be provided for the data processing node. Thus, this enables decision-making to continue when the failover condition occurs and allows for redundancy so that the production computing environment and operations may receive decisions from a main decision services even during data processing node failure.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a computing device 110 and a service provider server 120 in communication over a network 140. Computing device 110 may be utilized by a user to access a computing service or resource provided by service provider server 120, where service provider server 120 may provide various data, operations, and other functions to computing device 110 via network 140 including those associated with utilizing computing service that utilize decision services for decision-making during data processing. In this regard, computing device 110 may be used to access a website, application, or other platform that provides computing services. Service provider server 120 may provide computing services that process data and provide decisions in response to data processing request via decision services, where the decision services may dynamically inject nodes to a secondary decision service if a node in a main decision service fails.

Computing device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Computing device 110 may be implemented as a communication device that may utilize appropriate hardware and software configured for wired and/or wireless communication with service provider server 120. For example, in one embodiment, computing device 110 may be implemented as a personal computer (PC), a smart phone, laptop/tablet computer, wristwatch with appropriate computer hardware resources, eyeglasses with appropriate computer hardware (e.g. GOOGLE GLASS ®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Computing device 110 of FIG. 1 contains an application 112, a database 116, and a network interface component 118. Application 112 may correspond to executable processes, procedures, and/or applications with associated hardware. In other embodiments, computing device 110 may include additional or different modules having specialized hardware and/or software as required.

Application 112 may correspond to one or more processes to execute software modules and associated components of computing device 110 to provide features, services, and other operations for a user over network 140, which may include accessing and utilizing computing services provided by service provider server 120. In this regard, application 112 may correspond to specialized software utilized by a user of computing device 110 that may be used to access a website or application (e.g., mobile application, rich Internet application, or resident software application) that may display one or more user interfaces that allow for interaction with the computing services of service provider server 120. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website. However, in other embodiments, application 112 may include a dedicated application of service provider server 120 or other entity.

Application 112 may be associated with account information, user financial information, and/or transaction histories. However, in further embodiments, different services may be provided via application 112, including social networking, media posting or sharing, microblogging, data browsing and searching, online shopping, and other services available through service provider server 120. Thus, application 112 may also correspond to different service applications and the like. When utilizing application 112 with service provider server 120, application 112 may request processing of a data processing request, such as by providing a data load for processing when utilizing one or more computing services of service provider server 120. The data processing request may correspond to account login, authentication, electronic transaction processing, and/or use of other services described herein. The data processing request may have a corresponding data load that is processed via one or more decision services of service provider server 120 to provide a decision that is used to provide a resulting output and result. As such, application 112 may be used with the decision services of service provider server 120, which may provide redundancy during data processing node failure through dynamically injecting nodes during node failure.

In various embodiments, computing device 110 includes other applications 114 as may be desired in particular embodiments to provide features to computing device 110. For example, other applications 114 may include security applications for implementing client-side security features, programmatic client applications for interfacing with appropriate application programming interfaces (APIs) over network 140, or other types of applications. Other applications 114 may also include email, texting, voice and IM applications that allow a user to send and receive emails, calls, texts, and other notifications through network 140. In various embodiments, other applications 114 may include financial applications, such as banking applications. Other applications may include social networking applications, media viewing, and/or merchant applications.

Other applications 114 may also include other location detection applications, which may be used to determine a location for the user, such as a mapping, compass, and/or GPS application, which can include a specialized GPS receiver that determines location information for computing device 110. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of computing device 110, such as display devices capable of displaying information to users and other output devices, including speakers.

Computing device 110 may further include database 116 stored on a transitory and/or non-transitory memory of computing device 110, which may store various applications and data and be utilized during execution of various modules of computing device 110. Database 116 may include, for example, identifiers such as operating system registry entries, cookies associated with application 112 and/or other applications 114, identifiers associated with hardware of computing device 110, or other appropriate identifiers, such as identifiers used for payment/user/device authentication or identification, which may be communicated as identifying the user/computing device 110 to service provider server 120. Moreover, database 116 may include data used for data processing request, such as data that may be provided as a data load processed by service provider server 120.

Computing device 110 includes at least one network interface component 118 adapted to communicate with service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide computing services that utilize decision services for decision-making in an intelligent system to provide responses, output, and/or results to computing device 110 based on data processing requests. In this regard, service provider server 120 includes one or more processing applications which may be configured to interact with computing device 110. For example, service provider server 120 may deploy decision services that dynamically inject nodes that call secondary decision services during node failure in a main decision service. In one example, service provider server 120 may be provided by PAYPAL®, Inc. of San Jose, Calif., USA. However, in other embodiments, service provider server 120 may be maintained by or include another type of service provider.

Service provider server 120 of FIG. 1 includes service applications 130, a database 122, and a network interface component 126. Service applications 130 may correspond to executable processes, procedures, and/or applications with associated hardware. In other embodiments, service provider server 120 may include additional or different modules having specialized hardware and/or software as required.

Service applications 130 may correspond to one or more processes to execute modules and associated specialized hardware of service provider server 120 to provide computing services for account usage, digital electronic communications, electronic transaction processing, and the like. In this regard, service applications 130 may correspond to specialized hardware and/or software used by a user associated with computing device 110 to utilize one or more computing services, which in turn utilize decision services and microservices for decision-making during runtime. Service applications 130 may correspond to electronic transaction processing, account, messaging, social networking, media posting or sharing, microblogging, data browsing and searching, online shopping, and other services available through service provider server 120. Service applications 130 may be used by a user to establish an account and/or digital wallet, which may be accessible through one or more user interfaces, as well as view data and otherwise interact with the computing services of service provider server 120. In various embodiments, financial information may be stored to the account, such as account/card numbers and information. A digital token or other account for the account/wallet may be used to send and process payments, for example, through an interface provided by service provider server 120. The payment account may be accessed and/or used through a browser application and/or dedicated payment application, which may provide user interfaces for use of the computing services of service applications 130.

The computing services may be accessed and/or used through a browser application and/or dedicated payment application executed by computing device 110, such as application 112 that displays UIs from service provider server 120. Such account services, account setup, authentication, electronic transaction processing, and other computing services of service applications 130 may utilize decision services 132, such as for authentication, electronic transaction processing, risk analysis, fraud detection, and the other decision-making and data processing required by the aforementioned computing services. Decision services 132 may include main services 133 and secondary services 134. Main services 133 may correspond to main decision services used for decision-making using rules-based and/or AI models and engines. Main services 133 may correspond to more robust decision-making services, such as one having trained AI models, additional or more precise rules, and the like. Secondary services 134 may correspond to fallback or backup decision services, which are utilized during a failover state of main services 133, such as if a data processing node within main services 133 fails. In this regard, secondary services 134 may be less precise or utilize less rules and/or AI models, but may provide faster response and/or decisions, as well as be less likely to fail.

However, as secondary services 134 may be called only in a small number or percentage of data processing requests (e.g., where main services 133 adjudicate and provide a decision in ~99% of data processing requests), continually calling secondary services 134 during each data processing request unnecessarily wastes computing resources, data processing, and processing times. As such, service applications 130 may utilize dynamic injection processor 136 to limit calls to secondary service 134 to situations where one or more data processing nodes fails (e.g., those nodes within a decision service that have executable instructions to process one or more computing tasks based on a data load and provide a response used in decision-making). In this regard, dynamic injection processor 136 may interact with a health monitor 137 to detect node execution health and/or average node execution time. The average node execution time may be skewed or weighted for more recent node execution times, such as a last ten execution times and/or favoring a most recent execution time and linearly or exponentially decreasing weights of each subsequent execution time in the past for the data processing node.

Dynamic injection processor 136 may further interact with a data source that provides execution statistics, such as a start time of main services 133 on receiving a data processing request, an average response time for main services 133 and/or secondary services 134, an SLA of main services 133 and/or secondary services 134, and/or a context of DAGs 124 that is used to execute the nodes in main services 133. Using the data from health monitor 137 and the execution statistics, dynamic injection processor 136 may determine whether a primary data processing node in one of main services 133 has failed and a secondary data processing node is required to be injected to one of DAGs 124 at a location or vertex for the failed node. The secondary data processing node may then execute a call to one of secondary services 134 to receive a response for the failed node's computing tasks based on the corresponding data load. For example, dynamic injection processor 136 may utilize rules and/or a rule-based engine for determining whether a data processing node has failed and injection of a further node that calls one of secondary services 134 is required.

In further embodiments, dynamic injection processor 136 may include AI models, such as machine learning (ML) or neural network (NN) models. AI models may generally correspond to any artificial intelligence that performs decision-making, such as rules-based engines and the like. However, AI models may also include subcategories, including ML models and NN models that instead provide intelligent decision-making using algorithmic relationships.

Generally, NN may include deep learning models and the like, and may correspond to a subset of ML models that attempt to mimic human thinking by utilizing an assortment of different algorithms to model data through different graphs of neurons, where neurons include nodes of data representations based on the algorithms that may be interconnected with different nodes. ML models may similarly utilize one or more of these mathematical models, and similarly generate layers and connected nodes between layers in a similar manner to neurons of NN models.

When building ML models for dynamic injection processor 136, training data may be used to generate one or more classifiers and provide recommendations, predictions, or other outputs based on those classifications and an ML model. The training data may be used to determine input features for training predictive scores for node failure and/or classify whether a node has failed. For example, ML models for dynamic injection processor 136 may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models for dynamic injection processor 136.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models for dynamic injection processor 136 that attempt to classify whether a data processing node in main services 133 has failed or will fail, or otherwise score a likelihood of failure for comparison to a threshold. Thus, when ML models for dynamic injection processor 136 are used to perform a predictive analysis and output, the input may provide a corresponding output based on the classifications trained for ML models for dynamic injection processor 136.

ML models for dynamic injection processor 136 may be trained by using training data associated with past node failures, as well as the aforementioned features for a start time of main services 133 on receiving a data processing request, an average response time for main services 133 and/or secondary services 134, an SLA of main services 133 and/or secondary services 134, and/or a context of DAGs 124 that is used to execute the nodes in main services 133. By providing training data to train ML models for dynamic injection processor 136, the nodes in the hidden layer may be trained (adjusted) such that an optimal output (e.g., a classification) is produced in the output layer based on the training data. By continuously providing different sets of training data and penalizing ML models for dynamic injection processor 136 when the output of ML models for dynamic injection processor 136 is incorrect, ML models for dynamic injection processor 136 (and specifically, the representations of the nodes in the hidden layer) may be trained (adjusted) to improve its performance in data classification. Adjusting ML models for dynamic injection processor 136 may include adjusting the weights associated with each node in the hidden layer. Thus, the training data may be used as input/output data sets that allow for ML models for dynamic injection processor 136 to make classifications based on input attributes. The output classifications for an ML model trained for dynamic injection processor 136 may be classifications of likelihood of node failure during runtime of main services 133.

Additionally, service provider server 120 includes database 122. Database 122 may store various identifiers associated with computing device 110. Database 122 may also store account data, including payment instruments and authentication credentials, as well as transaction processing histories and data for processed transactions. Database 122 may store financial information and tokenization data. Database 122 may further store DAGs 124, which may correspond to graphs of nodes (e.g., as vertices) connected by edges to generate pathways that are used to execute data processing nodes in accordance with the graphs. DAGs 124 may be accessed from database 122 when dynamic injection processor 136 determines a location or vertex to inject or insert secondary or fallback nodes that call secondary services 134 during failure of primary nodes within main services 133.

In various embodiments, service provider server 120 includes at least one network interface component 126 adapted to communicate computing device 110 and/or other devices and servers over network 140. In various embodiments, network interface component 126 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
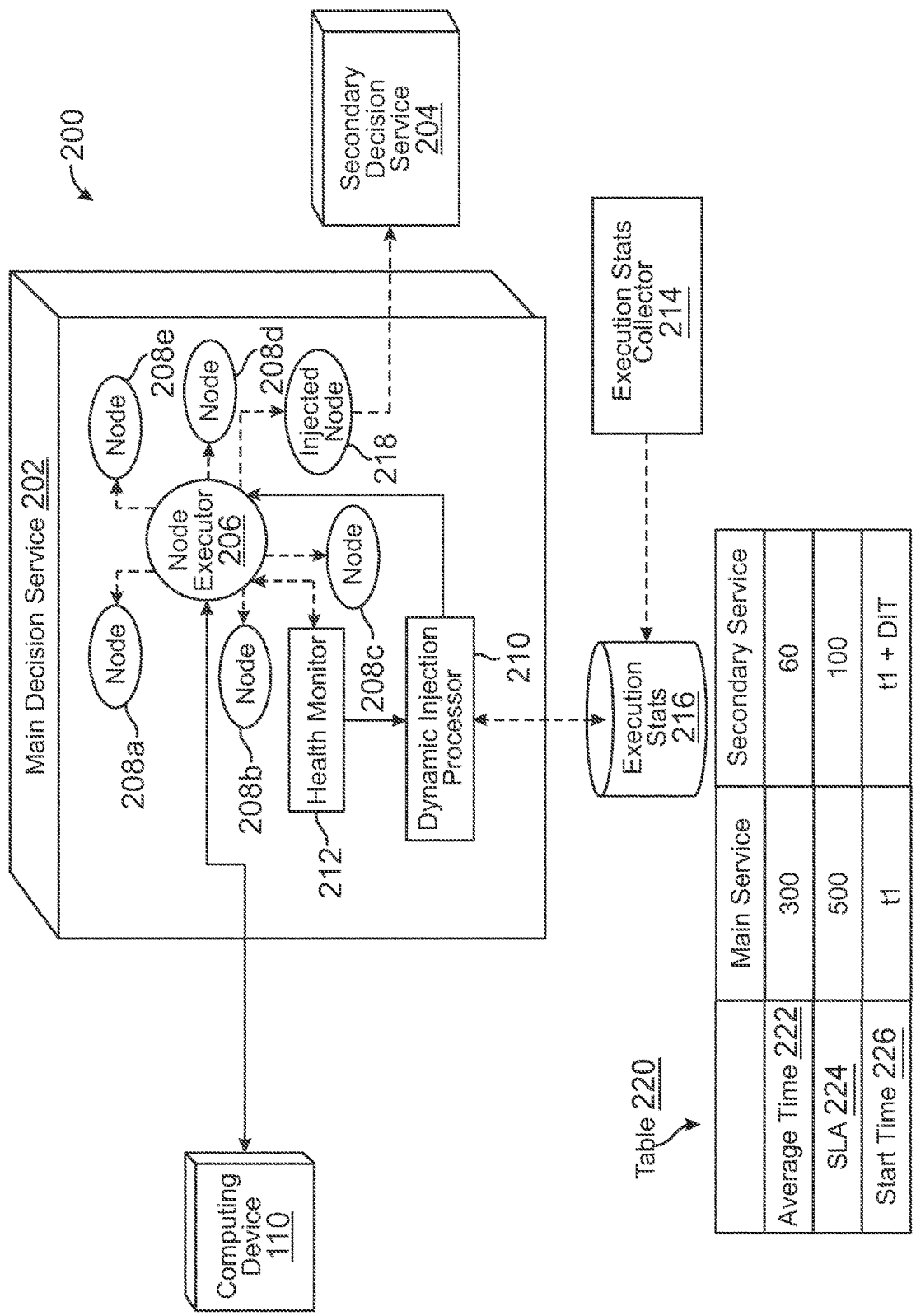
FIG. 2 is an exemplary system environment where a dynamic injection processor may detect data processing node failure in a main decision service and inject a node to make a call to a secondary service, according to an embodiment.

FIG. 2 is an exemplary system environment 200 where a dynamic injection processor may detect data processing node failure in a main decision service and inject a node to make a call to a secondary service, according to an embodiment. System environment 200 of FIG. 2 includes a main decision service 202 and a secondary decision service 204 corresponding to one of main services 133 and secondary services 134, respectively, discussed in reference to system 100 of FIG. 1. In this regard, computing device 110, discussed in reference to system 100, may access a service provider associated with main decision service 202 and secondary decision service 204 to request use of one or more computing services.

In system environment 200, computing device 110 initially requests data processing, such as by providing one or more data loads via a computing service that requires action from a service provider. Thus, main decision service 202 may be invoked in order to process a data processing request and provide a decision used when responding to computing device 110. In this regard, main decision service 202 includes a node executor 206 connected to five data processing nodes, nodes 208a, 208b, 208c, 208d, and 208e. A dynamic injection processor 210 further connects and communicates with node executor 206 to perform dynamic injection of data processing nodes based on data from a health monitor 212, as well as data from additional internal and external sources. For example, dynamic injection processor 210 may further receiving information about DAGs and other executable processing flows for nodes 208a-e from one or more internal components of main decision service 202, such as node executor 206. SLAs and other requirements may also be received from internal components where applicable.

Further, external sources may also provide this information to dynamic injection processor 210, such as execution stats collection 214 that may provide execution statistics or stats 216. Thus, when providing current or historical information about the execution times of main decision service 202 and secondary decision service 204, the SLAs for main decision service 202 and secondary decision service 204, and/or one or more DAGs execute by main decision service 202 (e.g., with nodes 208a-e), execution stats collector 214 may generate execution stats 216 for this data. Dynamic injection processor 210 may receive execution stats 216, which may be used with health monitor 212 to determine if one or more of nodes 208a-e has failed or is predicted to fail (e.g., timeout or provide insufficient accuracy for decision-making). In various embodiments, execution stats 216 may also be used when training one or more ML models of dynamic injection processor 210.

Client device 110 may provide a data processing request with a data load (e.g., authentication information, electronic transaction processing information, etc.) and the service provider may utilize main decision service 202 for decision-making. Main decision service 202 receives the data processing request, and node executor 206 is invoked and/or executed. Node executor 206 then calls nodes 208a-e to perform data processing for computing tasks for nodes 208a-e based on executable instructions for nodes 208a-e. When main decision service 202 begins execution and runtime, dynamic injection processor 210 may initiate a timer or detect a timestamp that allows for determination of when main decision service 202 received a request and/or began processing the request.

System environment 200 further shows a table 220, which may be used in determining a dynamic injected time (DIT). The DIT may be used by dynamic injection processor 210 to determine whether dynamic injection processor 210 should insert an injected node 218 to main decision service 202 and a DAG currently being used by node executor 206 to request responses from nodes 20a-e during decision-making. For example, table 220 shows an average time 220 required for main decision service 202 and secondary device service 204 to respond to a data processing request with a decision, such as a response to a data load (e.g., an authentication decision, risk decision, etc.). Average time 222 for main decision service 202 is shown as 300 ms and for secondary decision service as 60 ms. Table 220 further includes an SLA 224, which corresponds to the required time to respond to a data processing request according to the SLA negotiated between computing device 110 and the corresponding service provider associated with main decision service 202. In this regard, SLA 224 correspond to the maximum amount of time negotiated between devices and/or servers for the required level of service that is provided. SLA 224 for main decision service 202 is shown as 500 ms and for secondary decision service as 100 ms. Table 220 further includes start time 226 for main decision service 202 and secondary decision service 204. For main decision service 202, start time may be t1 or an initial starting millisecond or timestamp (down to a millisecond). Therefore, start time 226 for secondary decision service 204 may be t1+DIT. Thus, injection or insertion of injected node 218 to call secondary decision service 204 should occur before t1+DIT meets or exceeds average time 220 and/or SLA 224.

In one embodiment, to compute the DIT the following equation may be used:

$$Fx\{t\}=\{(\text{Lower of } X-\text{Higher of } Y), Ctx\} \quad \text{Equation 1:}$$

Where X is average time 220 or SLA 224 of the main service (main decision service 202), Y is average time 220 or SLA 224 of the secondary service (e.g., secondary decision service 204), and Ctx is the context of the currently executing DAG by node executor 206 for the data processing request. However, it is understood that Equation 1 is not limiting, and other equations may be utilized to determine when to inject injected node 218 to a DAG being executed by node executor with nodes 208a-e, thereby executing a call to secondary decision service 204.

Dynamic injection processor 210 may monitor node execution health of nodes 208a-e using health monitor 212 and compare to execution states 216 for determination of whether injected node 218 is required to be injected. For example, one or more of nodes 208a-e may indicate good health and/or execution times that are consistent with meeting average time 220 and/or SLA 224 for main decision service 202. However, another one of nodes, such as node 208c for example, may have correspond node execution health and/or execution time that would cause the node to fail, timeout, and/or provide inaccurate results within the requirements of average time 220 and/or SLA 224. This may be performed using the above Equation 1 or the like with one or more ML that determine timeout and failure of main decision service 202 will occur due to node 208c's execution health and/or execution time.

As such, dynamic injection processor 210 may dynamically inject computing code to computing code of a currently executing DAG by node executor 206 with nodes 208a-e. For example, a location or vertex within the DAG may be determined for insertion and/or injection of injected node 218. This may correspond to a vertex corresponding to the failed node, node 208c. However, in other embodiments, along an edge leading or trailing node 208c, such as at a location between a previous or a subsequent node along a pathway using node 208c, injected node 218 may be inserted. Insertion of injected node 218 may result in executable computing code for one or more computing tasks that execute a call to secondary decision service 204 to perform the required computing tasks of node 208c and provide a response to the computing tasks, which may then be used with node executor 206 and the currently executing DAG when determining a decision to the data processing request.

Node executor 206 may continue executing the DAG and receive all responses from nodes 208a-e (with injected node 218 acting in place of node 208c) and provide a resulting decision. Where node 208c comes back online or is no longer considered failed, injected node 218 and corresponding executable code may be removed from main decision service 202 and/or the DAG; however, injected node 218 may remain with the DAG in the event that node 208c is still considered failed by dynamic injection processor 210.

Figure 3A:
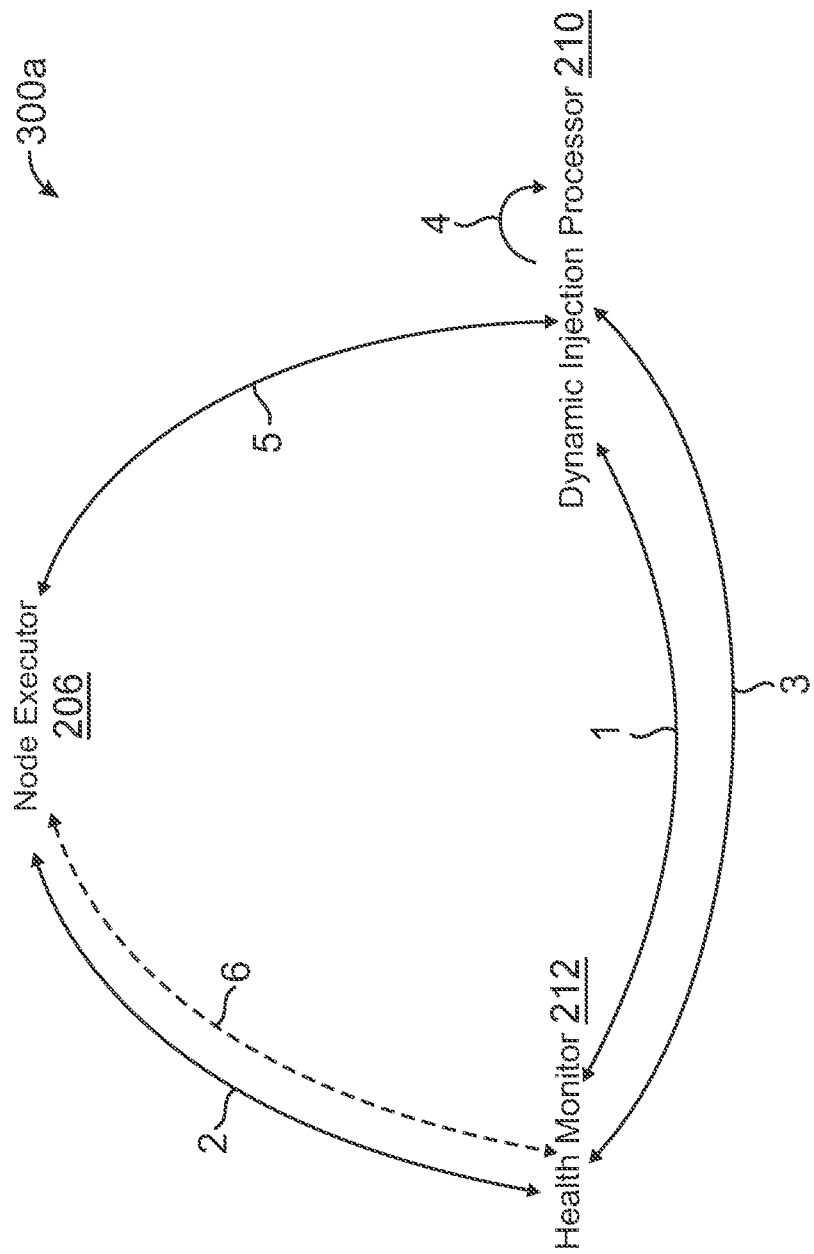
FIG. 3A is an exemplary diagram of interactions between internal components of a decision service when determining whether to inject a data processing node to call a secondary service during node failure, according to an embodiment.

FIG. 3A is an exemplary diagram 300a of interactions between internal components of a decision service when determining whether to inject a data processing node to call a secondary service during node failure, according to an embodiment. Diagram 300a includes node extractor 206, dynamic injection processor 210, and health monitor 212 discussed in reference to system environment 200 of FIG. 2. Diagram 300a may correspond to a system of service provider server 120 that dynamically injects data processing nodes to make calls to secondary decision services when one or more data processing nodes of a main decision service have failed, such as during runtime of the main decision service when processing interactions client device 110 with service provider server 120.

In diagram 300a, at interaction 1, health monitor 212 and dynamic injection processor 210 interact to exchange data necessary for determining whether a data processing node has failed or will fail during runtime of a main decision service, which may cause a timeout or inaccurate decision by the main decision service. For example, dynamic injection processor 210 may utilize execution statistics for the main decision service and/or a secondary decision service, which may be used to determine whether a data processing node may fail during runtime of the main decision service. During interaction 1, dynamic injection processor 210 may query health monitor 212 for data associated with the execution statistics, such as information about the node execution health and/or execution times.

At interaction 2, health monitor 212 interacts with node executor 206 to monitor data processing nodes based on the queried data from dynamic injection processor 210. The information may correspond to current node execution health and/or execution times, such as whether the data processing node is offline, encountering errors during execution, is timing out, or is providing inaccurate or inconsistent responses when executing computing tasks based on data loads. Node executor 206 may respond with information about connected data processing nodes, such as information about recent node execution health and/or execution processing times. Health monitor 212 may then collect recent data for the node execution health and/or execution processing times and may keep track of recent and historical data for the data processing nodes of the main decision service. At interaction 3, health monitor 212 responds to dynamic injection processor 210 with the information requested by dynamic injection processor 210. Interactions 1-3 may be continuously and/or periodically performed in order to ascertain the health and execution times of the data processing nodes in order to determine whether a data processing node may fail. Thus, interactions 1-3 continue to monitor the overall execution health and execution times of the corresponding main decision service to determine whether a call to a secondary decision service is required for one or more failed nodes.

At interaction 4, dynamic injection processor 210 performs internal data processing on the data received from health monitor 212 at interaction 3. This data processing may be comparing and/or processing the data associated with the data processing node's execution health and/or execution times, for example, using one or more ML models and/or rules-based engines. Dynamic injection processor 210 may predict whether the main decision service will fail, encounter a timeout, or provide an inaccurate decision in response to a data processing request, which results from one or more data processing nodes used in a DAG failing. This may occur when the data processing node is unable to execute their computing tasks, is providing inaccurate results, or is taking too long and will cause the main decision service to exceed an average execution time or SLA execution time for providing a decision for a data processing request.

If dynamic injection processor 210 determined a data processing node has, will, or is likely to fail (e.g., meeting or exceeding a threshold likelihood), at interaction 5, dynamic injection processor 210 may interact with node executor 206 in order to dynamically inject a node to a location or vertex within a DAG. The injected node may instead include executable instructions to execute an API call to a secondary decision service to provide a response in place of the failed node. The injected node includes computing tasks to call the secondary decision service with the data load and request a response similar to what would be provided by the computing tasks of the failed node. Once injected, node executor 206 may continue executing the additional data processing nodes in accordance with the DAG and may generate a decision in response to the data processing request. At an optional interaction 6, health monitor 212 may continue to monitor node extractor in order to ascertain the execution health and/or execution time of the failed data processing node. This may allow dynamic injection processor 210 to determine whether further nodes are to be injected, or if an already injected and deployed node may be removed so that the DAG may resume normal functioning with the primary node in the main decision service that previously failed.

FIG. 3B is an exemplary diagram 300b of a decision quality table for node execution health in a decision service, according to an embodiment. Diagram 300b includes health tables 302 and 304 determined by dynamic injection processor 210 and/or health monitor 212 discussed in reference to system environment 200 of FIG. 2. In this regard, health tables 302 and 304 may be used when determining whether to dynamically inject a data processing node to call a secondary decision service during failure of a data processing node of a main decision service.

In diagram 300b, health tables 302 and 304 include nodes 306 corresponding to data processing nodes within a main decision service, node execution health 308 corresponding to the execution health of each node (e.g., online, available, not encountering errors during data processing, providing accurate results and responses, etc.), and runtime threshold exceeded 310. In health table 302, a row 312 is assigned to a node 1 for nodes 306, a row 314 is assigned to a node 2 for nodes 306, and a row 316 is assigned to a node 3 for nodes 306. In health table 304, a row 318 is assigned to a node 1 for nodes 306, a row 320 is assigned to a node 2 for nodes 306, and a row 322 is assigned to a node 3 for nodes 306. Nodes 1, 2, and 3 may be the same nodes during different runtimes of a main decision service or may be different nodes in a different main decision service and/or DAG.

In health table 302, rows 312 and 314 show nodes 1 and 2, respectively, as having an indication of "good" under node execution health 308 and not exceeding a runtime under runtime threshold exceeded 310. However, row 316 for node 3 indicates that while node execution health 308 is good, runtime threshold exceeded 310 has been met, as shown as "yes." This may occur when node 3 is exceeding an average runtime and/or a runtime required by an SLA. In such embodiments, node 3 is considered failed, and thus a secondary node to call a secondary decision service is required to be injected in place of node 3. In health table 304, rows 318 and 320 show nodes 1 and 2, respectively, as having an indication of "good" under node execution health 308 and not exceeding a runtime under runtime threshold exceeded

310. However, row 322 for node 3 indicates that node execution health 308 is "bad," and therefore has failed or will fail during runtime when required to execute tasks to provide a response. Thus, node, 3 is similarly considered failed and requiring injection of the secondary node of the secondary decision service.

Figure 4:
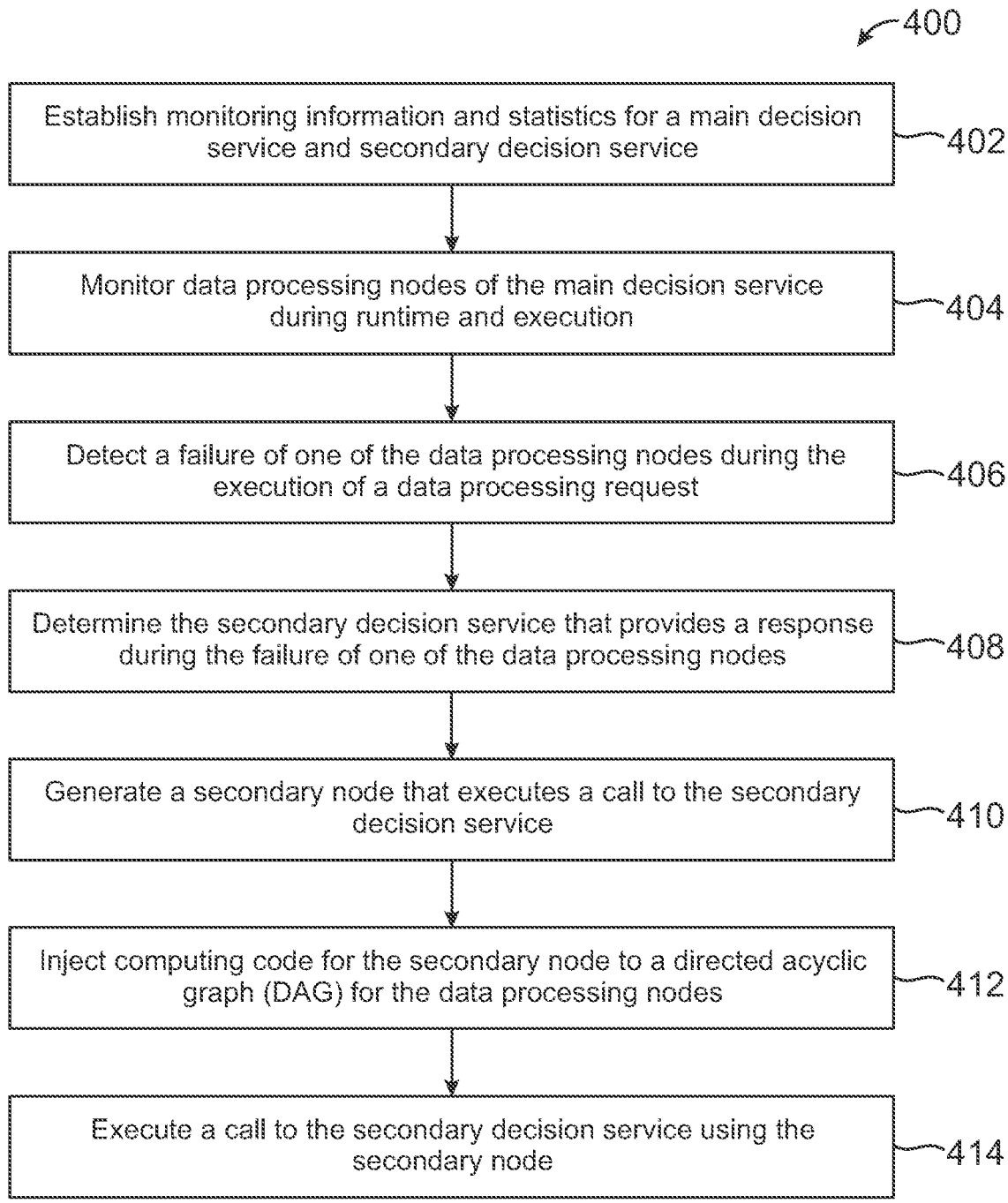
FIG. 4 is a flowchart of an exemplary process for dynamic node insertion of secondary services for high-availability during main decision failure at runtime, according to an embodiment.

FIG. 4 is a flowchart 400 of an exemplary process for dynamic node insertion of secondary services for redundancy during main decision failure at runtime, according to an embodiment. Note that one or more steps, processes, and methods described herein of flowchart 400 may be omitted, performed in a different sequence, or combined as desired or appropriate.

At step 402 of flowchart 400, monitoring information and statistics for a main decision service are established. The monitoring information may correspond to node execution health and node execution times of data processing nodes within the decision services, which may correspond to a most recent or set of most recent data points for such information. The statistics may similarly correspond to statistics for execution time and health of the main and secondary decision services, as well as DAGs executable or in execution by the main and secondary decision services and in context of those DAGs. At step 404, the data processing nodes of the main decision service are further monitored during runtime and execution. This may correspond to monitoring the nodes while a DAG is being executed to provide a decision using the nodes within the main decision services.

At step 406, a failure of one of the data processing nodes is detected during the execution of a data processing request. Failure may correspond to timeout and/or poor decision quality, which may occur due to an issue in node execution health and/or exceeding a runtime execution threshold. For example, node execution health may be used to determine whether a data processing node is capable of providing a response and the response is accurate. Node execution time may be compared to a threshold node execution time to determine whether decision service timeout may occur due to one or more data processing nodes.

Once a failure is detected, at step 408, the secondary decision service that provides a response during the failure of the one of the data processing nodes is determined. The secondary decision service may correspond to a fallback or backup decision service that may utilize faster and/or more reliable rule-based engines and/or ML models to perform decision-making on behalf of the main decision service. However, a secondary decision service may not have the accuracy of a main decision service and is therefore not utilized during all decision-making and only is relied on as a fallback.

In order to call the secondary decision service to provide a response in place of the failed node, at step 410, a secondary node is generated that executes a call to the secondary decision service. The node may be generated by retrieving and/or determining executable computing code that performs a call to the secondary decision service to perform the computing tasks of the failed computing node. At step 412, computing code for the secondary node is injected to a DAG for the data processing nodes. The DAG may correspond to a graphical representation of an order and/or pathway for execution of the data processing nodes. Thus, a node executor may use a DAG when calling on and executing the data processing nodes of the main decision service.

When injecting the computing code for the secondary node, the computing code may be injected using the node executor and/or computing code for the DAG utilized by the node executor. The secondary node may be injected along an edge and/or at a vertex of the DAG that is associated with the failed node. At step 414, a call is then executed to the secondary decision service using the secondary node. The call may request a response to be determined by the secondary decision service for the computing tasks required by the failed node. The secondary decision service may then provide a response, which may be used in the currently executing DAG in place of the failed node. The node executor may then continue with processing the data processing request in accordance with the DAG, and may provide a decision used to respond to a computing device and/or in additional computing services.

Figure 5:
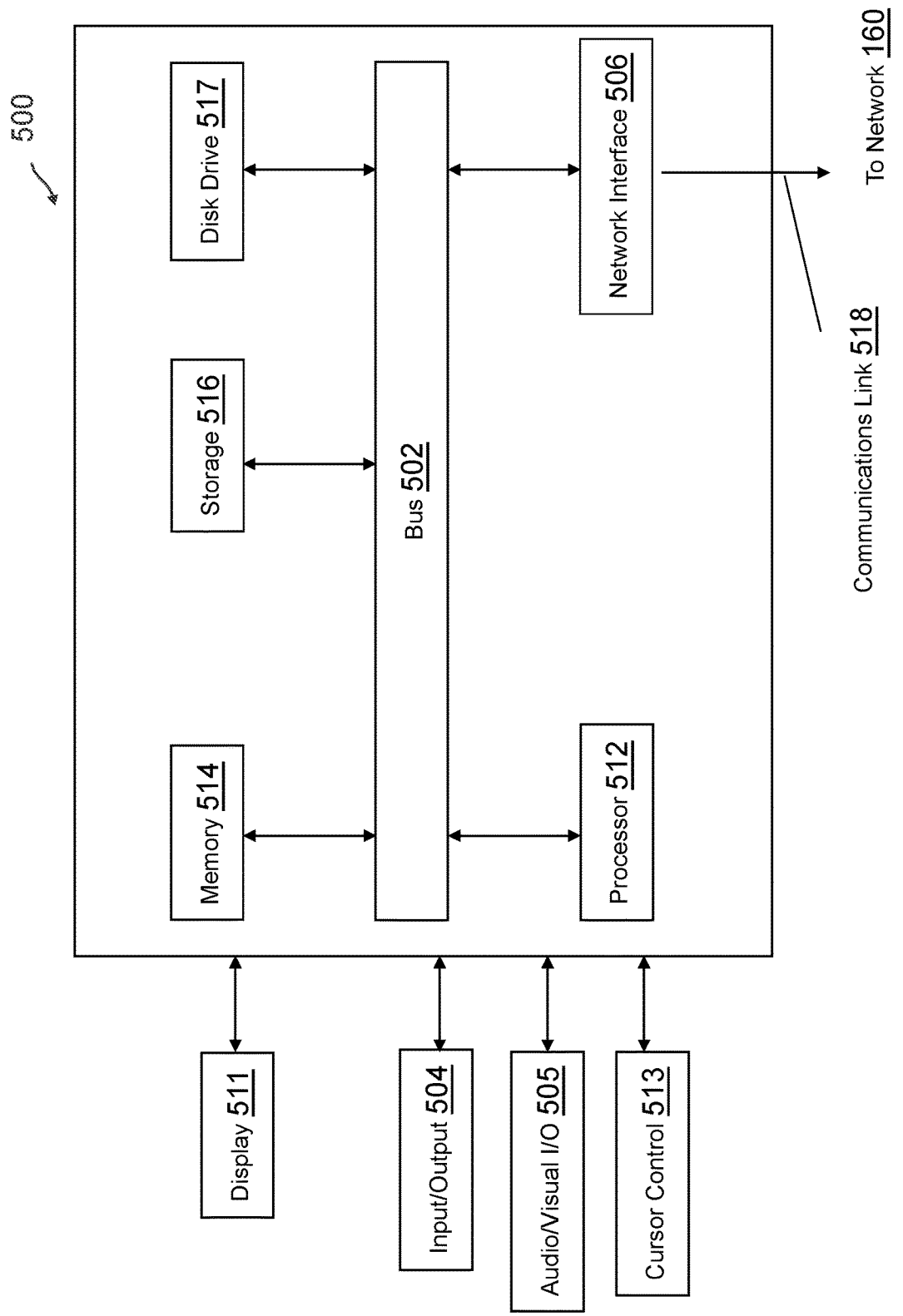
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
a non-transitory memory; and
one or more hardware processors coupled to the non-transitory memory and configured to read instructions from the non-transitory memory to cause the service provider system to perform operations comprising:
receiving monitoring information for a plurality of data processing nodes of a main decision service, wherein the monitoring information comprises an average execution time of the plurality of data processing nodes and a service level agreement (SLA) for the main decision service;
determining at least a start time of the main decision service when invoked for a data processing request from a client device;
detecting, during a runtime of a processing flow for the main decision service that provides a decision for the data processing request, a failure of a first data processing node of the plurality of data processing nodes of the main decision service based at least on the monitoring information and the start time, wherein each of the plurality of data processing nodes comprise executable instructions for one or more computing tasks for the decision by the main decision service;
determining a secondary decision service that provides a response for the data processing request in place of the first data processing node during the failure of the first data processing node, wherein the secondary decision service comprises a fallback to the plurality of data processing nodes;
dynamically injecting a second data processing node for the first data processing node to the processing flow during the runtime of the main decision service, wherein the injected second data processing node executes a call to the secondary decision service for the response to the data processing request; and
utilizing, for the main decision service, the injected second data processing node in place of the first data processing node during the failure of the first data processing node.

2. The service provider system of claim 1, wherein, prior to the detecting, the operations further comprise:
monitoring the plurality of data processing nodes for the main decision service for one or more failures of the plurality of data processing nodes during the runtime.

3. The service provider system of claim 2, wherein, prior to the dynamically injecting the second data processing node, the operations further comprise:
determining a directed acyclic graph (DAG) representing the processing flow of the plurality of data processing nodes for the main decision service; and
determining a vertex in the DAG associated with the first data processing node to inject the second data processing node, wherein the vertex causes an execution of the call to the secondary decision service by the second data processing node during the failure of the first data processing node.

4. The service provider system of claim 2, wherein the secondary decision service comprises a fallback risk analysis decision service for a production computing environment of the service provider system or a fallback service provided by the main decision service for the production computing environment.

5. The service provider system of claim 2, wherein the monitoring the plurality of data processing nodes is based on at least the start time of the main decision service, an average response time for the main decision service, an average response time for the secondary decision service, a service level agreement (SLA) of the main decision service, an SLA of the secondary decision service, or a context of a currently executing DAG in the main decision service.

6. The service provider system of claim 1, wherein the detecting the failure utilizes a health monitor of the main decision service, wherein the health monitor is connected to a node executor of the main decision service for the plurality of data processing nodes, and wherein, prior to the detecting, the operations further comprise:
determining, using the health monitor, an execution health of each of the plurality of data processing nodes.

7. The service provider system of claim 6, wherein the operations further comprise:
providing execution statistics of the main decision service to a dynamic injection processor, wherein the detecting the failure further utilizes the execution health from the execution statistics.

8. The service provider system of claim 6, wherein the health monitor comprises at least one weight factor associated with the determining the execution health, and wherein the at least one weight factor affects a likelihood of requiring the second data processing node to be injected during the data processing request.

9. The service provider system of claim 1, wherein the secondary decision service comprises at least one policy rule associated with fraud prevention using the secondary decision service for the data processing request.

10. The service provider system of claim 1, wherein the main decision service comprises a risk analysis decision service, a marketplace recommendation decision service, an advertisement decision service, a search decision service, or a social payments decision service.

11. The service provider system of claim 1, wherein the second data processing node comprises a stand-in data processing node that is temporarily used in place of the first data processing node and removed from use after the first data processing node recovers from the failure.

12. A method comprising:
monitoring a main decision service during an execution of a plurality of nodes of the main decision service that provide a decision in response to a data processing request from a client device during use of a computing service, wherein the plurality of nodes provide individual responses for the decision using one or more executable computing tasks;
receiving, based on the monitoring, monitoring information for the plurality of nodes, wherein the monitoring information comprises a first average execution time of the plurality of nodes for the data processing request and a service level agreement (SLA) for the main decision service;
determining at least a start time of the main decision service when invoked for the data processing request;
predicting that a first node of the plurality of nodes will fail to provide a corresponding individual response during the execution of the plurality of nodes based at least on the monitoring information and the start time;
determining a secondary decision service that can be invoked to provide a functionality of the first node for the decision, wherein the functionality is associated with providing the corresponding individual response for the decision;
conditionally substituting computing code for a secondary node that calls the secondary decision service in place of the first node; and
executing a call to the secondary decision service using the secondary node.

13. The method of claim 12, wherein prior to the monitoring the main decision service, the method further comprises:
receiving monitoring information for the plurality of nodes with the main decision service,
wherein the monitoring the main decision service is performed by a dynamic injection processor with a health monitor for the main decision service using the monitoring information.

14. The method of claim 13, wherein the monitoring information further comprises a directed acyclic graph (DAG) associated with the plurality of nodes, and wherein the DAG comprises a processing order for the execution of the plurality of nodes that processes the data processing request for the main decision service.

15. The method of claim 13, wherein the dynamic injection processor comprises at least one machine learning (ML) model trained for a detection of a failure of one or more of the plurality of nodes based on the monitoring information, and wherein input features for the at least one ML model usable for the detection of the failure comprise at least one of a start time of the main decision service for the decision in response to the data processing request, the first average execution time of the main decision service, SLAs for the main decision service and the secondary decision service, and a currently executing DAG for the decision in response to the data processing request.

16. The method of claim 13, wherein the receiving the monitoring information further comprises receiving a second average execution time for the secondary decision service, wherein the determining the secondary decision service is based on the second average execution time.

17. The method of claim 12, wherein the secondary node comprises a stand-in node for the first node that has failed, and wherein the secondary node is removed after a re-initiation of the first node for an additional data processing request.

18. The method of claim 12, wherein at least one of the plurality of nodes comprises one of a client device request processor, a compute for business rules, a data loader, a validation of a data load of the data processing request, or a response builder.

19. A non-transitory machine-readable medium having stored thereon machine-readable instructions executable to cause a machine to perform operations comprising:
receiving execution information for a first decision service and a second decision service, wherein the execution information comprises an average time for the first decision service and the second decision service to provide a response to a request, and wherein the second decision service comprises a fallback decision service of the first decision service;
determining a service level agreement (SLA) for the first decision service and the second decision service, wherein the SLA comprises a maximum allowable time for the first decision service and the second decision service to provide the response to the request;
establishing a decision service health monitor based on the execution information and the SLA;
executing a dynamic injection processor with the decision service health monitor for the first decision service; and
monitoring the first decision service using the dynamic injection processor.

20. The non-transitory machine-readable medium of claim 19, wherein the operations further comprise:
   detecting a failure of a node within the first decision service using the decision service health monitor and the dynamic injection processor; and
   inserting computing code for a call to the second decision service using the dynamic injection processor.

\* \* \* \* \*

UNITED STATES PATENT AND TRADEMARK OFFICE
CERTIFICATE OF CORRECTION

PATENT NO. : 11,994,964 B2
APPLICATION NO. : 17/364746
DATED : May 28, 2024
INVENTOR(S) : Prabin Patodia and Sumit Kumar It is certified that error appears in the above-identified patent and that said Letters Patent is hereby corrected as shown below:

In the Claims

Claim 12, Column 21, Line 47, change "information comprises a first average execution time of" to --information comprises an average execution time of--.

Claim 15, Column 22, Lines 23-24, change "in response to the data processing request, the first average execution time of the main decision service, SLAS for the" to --in response to the data processing request, an average execution time of the main decision service and the secondary decision service, SLAs for the--.

Claim 16, Column 22, Lines 29-30, change "monitoring information further comprises receiving a second average execution time for the secondary decision" to --monitoring information further comprises receiving an average execution time for the secondary decision--.

Claim 16, Column 22, Line 32, change "service is based on the second average execution time." to --service is based on the average execution time.--.

Signed and Sealed this
Fifteenth Day of October, 2024

Katherine Kelly Vidal
*Director of the United States Patent and Trademark Office*